Dec. 22, 1953  O. L. PETERSON  2,663,854
BATTERY CABLE CLAMP
Filed Oct. 4, 1951
*Fig. 1.*
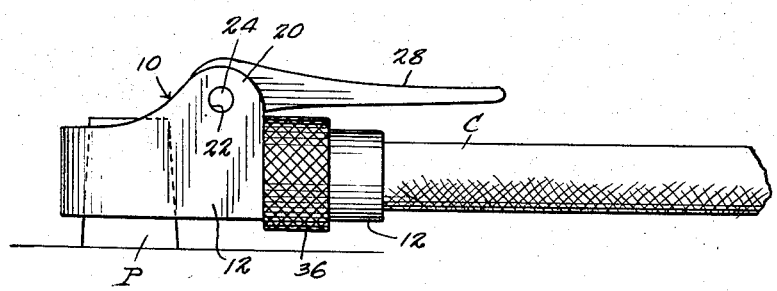
*Fig. 2.*
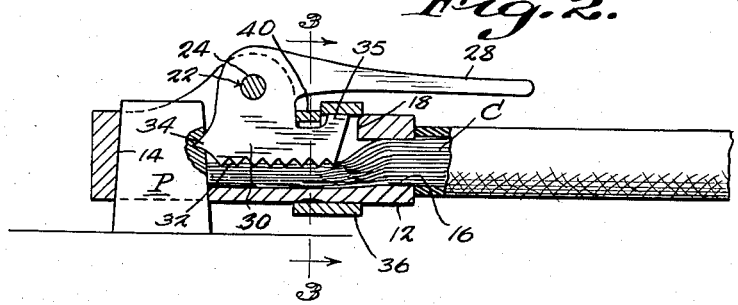
*Fig. 3.*  *Fig. 4.*
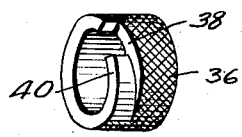
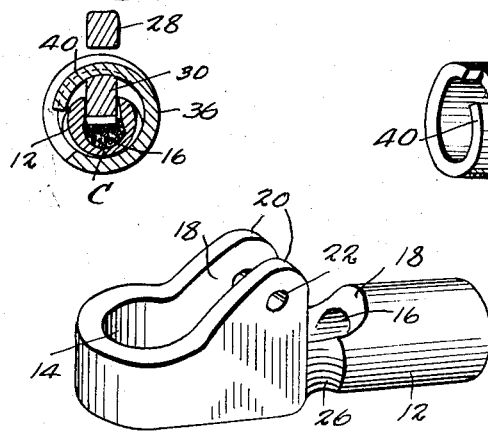
*Fig. 5.*
O. L. Peterson
INVENTOR
BY Chrnow+Co.
ATTORNEYS.

Patented Dec. 22, 1953

2,663,854

UNITED STATES PATENT OFFICE 2,663,854

BATTERY CABLE CLAMP

Oscar L. Peterson, Prentice, Wis.

Application October 4, 1951, Serial No. 249,683

6 Claims. (Cl. 339—225)

This invention relates to a battery cable clamp and has for its primary object to simultaneously clamp a cable formed of a group of electrical conductors to the post of a conventional storage battery.

Another object is to effect good electrical contact with the cable conductors and with the battery post so as to insure adequate flow of electrical energy from the battery through the cable.

A further object is to lock the clamp in clamped position so as to avoid accidental removal thereof once it has been coupled to the cable and battery post, and at the same time to permit the clamp to be released when servicing of the battery or cable may be required.

Among its features the invention embodies an elongated body member having a transversely extending battery post receiving opening extending therethrough adjacent one end thereof, a bore entering the opposite end of the body and communicating with the transverse opening, said body having a slot extending therethrough which communicates with the bore and with the transverse opening, a jaw pivotally mounted on the body and operable through the slot for engaging the conductors of a conventional battery cable, and a prong carried by the jaw and adapted to pierce the surface of a battery post thrust through the transverse opening to establish good electrical contact between the post and the conductors.

Other features include a lug carried by the jaw and a sleeve mounted on the body for movement longitudinally thereon into and out of lug engaging position, said sleeve serving to lock the jaw in conductor engaging position and the prong in battery post piercing position.

Still other features include means carried by the ring for engaging the lug and holding the ring against accidental longitudinal movement on the body.

In the drawings,

Fig. 1 is a side view of a cable clamp embodying the features of this invention, Fig. 2 is a longitudinal sectional view through the cable clamp illustrated in Fig. 1, Fig. 3 is a transverse sectional view taken substantially along the line 3—3 of Fig. 2, Fig. 4 is a perspective view of the jaw locking ring, and Fig. 5 is a perspective view of the cable clamp body.

Referring to the drawings in detail, this improved cable clamp designated generally 10 comprises an elongated body 12 having extended therethrough adjacent one end a transverse battery post receiving opening 14. Entering the body from the opposite end and communicating with the opening 14 is a longitudinal bore 16 in which the conductors of a conventional electrical cable are received. The body 12 is provided adjacent the junction of the bore 16 and the transverse opening 14 with an elongated longitudinal slot 18, and carried by the body and extending outwardly therefrom on opposite sides of the slot 18 and adjacent the junction of the bore with the opening 14 are ears 20 which are pierced with aligning openings 22 for the reception of a pivot pin 24. Formed in the body between the ears 20 and the end of the slot 18 remote from the opening 14 is an annular groove 26 the purpose of which will hereinafter appear.

Mounted for pivotal movement about the pivot pin 24 between the ears 20 is a hand lever 28 carrying a clamp jaw 30 which is adapted to be advanced through the slot 18 and carries a serrated edge 32 for engagement with the conductors C of a conventional electrical cable as will be readily understood upon reference to Fig. 2. The clamp jaw 30 is provided with a laterally extending prong 34 which when the jaw is closed projects into the battery post receiving opening 14 for piercing engagement with a conventional battery post P. It will thus be seen that by moving the hand lever 28 about the pivot 24, the jaw member 30 may be moved into clamping engagement with the conductors C and simultaneously the prong 34 may be moved into piercing engagement with the battery post P, to thus insure the establishment of good electrical conductivity between the battery post P and the conductors C.

In order to lock the jaw member in clamping position a lug 35 is carried by the jaw member and projects toward the handle 28. When the jaw member is fully closed, the lug 35 lies within the confines of the slot 18 adjacent the end thereof remote from the transverse opening 14, and mounted for longitudinal sliding movement on the body 12 between the ears 20 and the end thereof remote from the transverse opening 14 is a ring 36. As illustrated in Fig. 4, the ring 36 is provided with a circumferentially extending slit 38 adjacent one end thereof to form a tongue 40 which projects inwardly as it recedes from the periphery of the ring 36 to form a stop which when the ring is rotated, after having been moved into lug engaging position enters the space between the lug 35 and the junction of the jaw member 30 with the lever 28 to hold the ring against longitudinal movement on the body 12. It will be understood that when the ring is rotated so as to extract the tongue 40 from its position between the lug 35 and the junction of the jaws with the lever 28, the tongue 40 will be accommodated in the annular groove 26 in the body 12.

In use the conductors C of a conventional cable are bared to expose them for entrance into the bore 16 for engagement by the clamp 30. Upon moving the lever 28 in a clockwise direction when viewed in Fig. 1 into the position shown, the serrated edge 32 of the jaw 30 will engage the conductors C, and the prong 34 will be entered into the post P of a conventional battery. Having thus coupled the conductors to the battery post, the parts are locked by sliding the sleeve 36 longitudinally on the body 12 until it engages the lug 35 and upon rotating the sleeve, the tongue 40 will be moved into a position that will lock the sleeve 36 against longitudinal movement. In this way the device may be releasably secured to a conventional cable and battery post to establish good electrical conductivity between the two.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

1. A battery cable clamp comprising an elongated body of conducting material having a battery post receiving opening extending transversely therethrough adjacent one end thereof, said body having a longitudinal bore entering its opposite end and communicating with the transverse opening, a lever pivotally carried by the body adjacent the transverse opening, a cable clamping jaw carried by the lever and movable therewith into the bore adjacent the opening, and a battery post piercing prong carried by the jaw adjacent the opening for engaging and piercing a battery post.

2. A battery cable clamp comprising an elongated body of conducting material having a battery post receiving opening extending transversely therethrough adjacent one end thereof, said body having a longitudinal bore entering its opposite end and communicating with the transverse opening, a lever pivotally carried by the body adjacent the transverse opening, a cable clamping jaw carried by the lever and a battery post piercing prong carried by the jaw.

3. A battery cable clamp comprising an elongated body of conducting material having a battery post receiving opening extending transverely therethrough adjacent one end thereof, said body having a longitudinal bore entering its opposite end and communicating with the transverse opening, a lever pivotally carried by the body adjacent the transverse opening, said body having an elongated longitudinal slot opening into the bore and into the transverse opening, a cable clamping jaw carried by the lever and having a cable engaging face for movement in the slot and clamping a cable therein, and a battery post piercing prong carried by the jaw adjacent the cable engaging face for movement into a battery post as a cable is engaged by the face.

4. A battery cable clamp comprising an elongated body of conducting material having a battery post receiving opening extending transversely therethrough adjacent one end thereof, said body having a longitudinal bore entering its opposite end and communicating with the transverse opening, a lever pivotally carried by the body adjacent the transverse opening, said body having an elongated longitudinal slot opening into the bore and into the transverse opening, a cable clamping jaw carried by the lever and movable thereby in the slot for clamping a cable, a battery post piercing prong carried by the jaw and projecting therefrom toward the opening, and releasable means carried by the body and engaging the jaw for holding the jaw in cable clamping position and the prong in battery post piercing position.

5. A battery cable clamp comprising an elongated body of conducting material having a battery post receiving opening extending transversely therethrough adjacent one end thereof, said body having a longitudinal bore entering its opposite end and communicating with the transverse opening, a lever pivotally carried by the body adjacent the transverse opening, said body having an elongated longitudinal slot opening into the bore and into the transverse opening, a cable clamping jaw carried by the lever for movement thereby into clamping engagement with a cable in the bore, and a prong carried by the jaw for movement therewith into piercing engagement with a battery post in the opening.

6. A battery cable clamp comprising an elongated body of conducting material having a battery post receiving opening extending transversely therethrough adjacent one end thereof, said body having a longitudinal bore entering its opposite end and communicating with the transverse opening, a lever pivotally carried by the body adjacent the transverse opening, said body having an elongated longitudinal slot opening into the bore and into the transverse opening, a cable clamping jaw and battery piercing prong carried by the lever and movable thereby in the slot for clamping a cable and piercing a battery post, a lug on the jaw, and a ring mounted on the body to slide longitudinally thereof into and out of engagement with the lug.

OSCAR L. PETERSON.

References Cited in the file of this patent

UNITED STATES PATENTS

| Number | Name | Date |
|---|---|---|
| 2,110,918 | Roberts | Mar. 15, 1938 |
| 2,228,344 | Demeo | Jan. 14, 1941 |

FOREIGN PATENTS

| Number | Country | Date |
|---|---|---|
| 5,537/31 | Australia | Dec. 29, 1931 |
| 246,660 | Great Britain | Feb. 4, 1926 |